United States Patent
Oelschlaegel

[19]

[11] Patent Number: 6,146,527
[45] Date of Patent: Nov. 14, 2000

[54] SPIN-ON FILTER CARTRIDGE WITH REPLACEABLE ELEMENT

[75] Inventor: Victor R. Oelschlaegel, Oakdale, Calif.

[73] Assignee: Parker-Hannifin Corporation, Cleveland, Ohio

[21] Appl. No.: 09/063,655

[22] Filed: Apr. 21, 1998

[51] Int. Cl.[7] .................................................. B01D 35/30
[52] U.S. Cl. .......................... 210/232; 210/440; 210/443; 210/450; 210/453; 210/455; 210/493.2; 210/497.01; 210/DIG. 17
[58] Field of Search ...................................... 210/232, 443, 210/444, 450, 455, 456, 453, DIG. 17, 440, 493.1, 493.2, 497.01; 55/510

[56] References Cited

U.S. PATENT DOCUMENTS

| | | |
|---|---|---|
| 2,955,712 | 10/1960 | Gutkowski . |
| 3,567,023 | 3/1971 | Buckman ............................... 210/130 |
| 4,217,870 | 8/1980 | Schleiermacher . |
| 4,292,179 | 9/1981 | Stone et al. . |
| 4,302,330 | 11/1981 | Cusato, Jr. . |
| 4,617,118 | 10/1986 | Smart . |
| 4,654,142 | 3/1987 | Thomsen et al. . |
| 4,764,275 | 8/1988 | Robichaud . |
| 5,017,285 | 5/1991 | Janik et al. . |
| 5,035,797 | 7/1991 | Janik . |
| 5,045,192 | 9/1991 | Terhune . |
| 5,154,823 | 10/1992 | Ma et al. . |
| 5,171,430 | 12/1992 | Beach et al. . |
| 5,186,829 | 2/1993 | Janik . |
| 5,450,835 | 9/1995 | Wagner . |
| 5,560,824 | 10/1996 | Sann et al. . |
| 5,564,401 | 10/1996 | Dickson . |
| 5,593,577 | 1/1997 | Imai et al. . |

*Primary Examiner*—Matthew O. Savage
*Attorney, Agent, or Firm*—Christopher H. Hunter

[57] ABSTRACT

A filter cartridge includes a filter housing having a main housing portion and a removable end closure defining a filter element cavity. The main housing portion includes an open annular end having an in-turned annular lip with a series of receiving slots formed in the inner surface of the lip. A filter element is disposed within the housing cavity and includes an end cap with a series of axially-extending drive pins, and an axially-extending stand-off device, where the drive pins are axially longer than the stand-off device. A mounting hub having a central threaded collar for attachment to a base is disposed between the outer surface of the end cap and the lip of the main housing portion. The mounting hub includes a series of orientation through-holes which correspond to the location of the drive pins on the end cap. The orientation pins project through the through-holes in the mounting hub and are received in the receiving slots in the main housing portion to fix the mounting hub against rotation within the filter housing. The housing can then be spun-on to the base. The axially-extending stand-off device separates the mounting hub from the end cap to provide a flow path therebetween, and allow fluid to flow through outer through-holes in the mounting hub to the peripheral region of the filter element. The fluid can then flow radially-inward through the element, and through a central through-bore in the collar of the mounting hub to the base.

52 Claims, 3 Drawing Sheets

SPIN-ON FILTER CARTRIDGE WITH REPLACEABLE ELEMENT

FIELD OF THE INVENTION

The present invention relates generally to filter cartridges, and replaceable filter elements for such cartridges.

BACKGROUND OF THE INVENTION

A common spin-on type of filter cartridge has an outer cylindrical canister or housing enclosing a tubular filter element. One end of the housing has a tap plate with a threaded central opening to allow the filter element to be spun-on to a threaded spud on a base or head member. The spud has a central fluid passage to provide a first fluid path to the central cavity of the filter element. Other throughholes in the tap plate provide a separate fluid path from the base to the outer periphery of the filter element. An annular seal surrounding the central opening and located between the tap plate and the upper end cap separates the central fluid path from the peripheral fluid path. The filter element can be designed to filter fluid passing radially inward or radially outward through the filter element.

Such a spin-on type of filter cartridge as described above has received widespread acceptance for providing an end user with a filter cartridge which can be easily attached to and removed from a base member, and which provides satisfactory results in filtering fluid in the fluid system. Such cartridges are commonly used with internal combustion engines to filter fuel passing through the engine.

While the above-described type of spin-on filter cartridge is typically disposable, spin-on filter cartridges have also been developed where the housing is formed in two pieces and can be separated to allow removal and replacement of a spent filter element. The filter element can thereby be disposed when spent, and a fresh element introduced between the housing portions without having to dispose of the entire cartridge. This has some benefits as the disposed material is reduced, and the housing portions and other components can be manufactured from stronger and longer-lasting material (such as metal), which may not be as appropriate for disposal.

Filtering requirements, of course, can vary depending on the requirements of the fluid system. Filter elements which are suitable for replacement in an internal combustion engine, for example, commonly vary as to capacity and filter media qualities. While lower capacity and lower quality filter elements generally reduce the cost of the element for the end user, the lower cost units may not be compatible with the requirements for the engine. Incompatible or substandard replacement filter elements can have serious consequences for the operation and useful life of the engine. Moreover, the absence of a filter element within the housing can also seriously affect the life of the engine.

Certain techniques for securing a filter element to a base are shown in U.S. Pat. Nos. 5,035,797 and 5,186,829, where axially-extending keys are formed in the base of the assembly which are received in corresponding slots formed in the end cap of a filter element. The keys interlock in the slots to mount the element at a fixed angle relative to the base. The '829 patent further shows radially-projecting protrusions formed around the end cap which are received within corresponding tracks in the filter element base. A threaded locking ring retains the filter element to the base and can be removed to allow removal and replacement of the filter element. These patents generally address the problem of incompatible, substandard or missing replacement elements by requiring certain structural features to be provided on the filter element in order to match corresponding features on the base. By controlling the filter elements with such features, it can be assured that quality and capacity standards are maintained.

While these patents address some of the concerns associated with replacement filter elements, the elements shown in these patents combine the filter media with at least a portion of the housing as an integral unit, which requires these components to be thrown away when the filter element is replaced. Only a base or cover portion of the housing is retained when the filter element is replaced. This can increase the replacement cost of the element, and still have the drawback of increasing the disposal waste in landfills.

Thus, it is believed that there is a demand in the industry for a filter cartridge which prevents the use of improper, inappropriate or missing replacement filter elements, and which reduces or minimizes the waste associated with disposing of a spent filter element.

SUMMARY OF THE PRESENT INVENTION

The present invention provides a novel and unique spin-on type of filter cartridge and replacement element therefor, which overcomes at least some of the drawbacks associated with prior filter assemblies.

According to a preferred form of the present invention, the filter element includes an annular end cap with a series of drive pins extending axially away from the outer flat surface of the end cap. A disc-shaped mounting hub is provided with an inner flat surface in opposed relation to the outer flat surface of the end cap, and orientation throughholes which correspond to the location of the drive pins on the end cap. The through-holes in the mounting receive the drive pins from the end cap to rotationally fix the element with respect to the mounting hub.

The housing for the filter cartridge includes an open annular end with an in-turned annular lip defining a central circular opening. The in-turned annular lip includes an inner lip surface with receiving slots which also correspond to the location of the drive pins on the end cap. The drive pins extend through the orientation holes in the mounting hub and into the corresponding slots in the filter element housing to rotationally fix the mounting hub with respect to the housing.

The mounting hub includes a threaded central collar which is designed to be received in a threaded bore in the base member. When the element of the present invention is assembled in the housing, the mounting hub is rotationally fixed with respect to the housing which permits the housing to be spun-on to the base. If the filter element is missing or does not include such drive pins, the mounting hub rotates freely with respect to the housing and prevents the central collar from being threaded onto the base. The location (or size, etc.) of the drive pins can be selected for particular filter elements to ensure that an appropriate filter element is used with a particular fluid system.

An additional feature of the present invention is that the end cap of the filter element includes an axially-extending stand-off device as a series of discrete posts, or as an annular collar of flange. The stand-off device provides a gap between the outer flat surface of the end cap and the inner flat surface of the mounting hub when the filter element is assembled in the housing. The gap allows for a fluid path from throughholes in the mounting hub to the outer periphery of the filter element. The peripheral fluid path is separated from a central fluid path through the central collar in the mounting hub by a seal surrounding the central collar and located between the upper surface of the end cap and the lower surface of the mounting hub. A filter element without such a stand-off device on the end cap will be flush with the mounting hub—thereby preventing fluid flow through the element.

The housing for the filter cartridge includes a main cylindrical housing portion with the in-turned annular lip and central opening at one end, and an end closure at the other end which is threadably attached to the main housing portion. The filter element can be easily removed from the housing by unscrewing the end closure from the main housing portion, removing the spent element, and replacing the spent element with a fresh element having the same drive pin structure and axial stand-off device as the original element. The filter housing can include a retaining device such as a snap ring to prevent the mounting hub from falling out of the housing when the filter element is removed. The housing portions can be reused multiple times with the fresh element, which thereby allows stronger and longer-lasting material to be used for the housing portions.

The present invention thereby provides a novel and unique spin-on type of filter cartridge which prevents improper, inappropriate or missing filter elements from being used in the cartridge and which reduces disposal waste. The invention also provides a filter cartridge which can be easily attached to and removed from a base, allows strong and long-lasting material to be used for the housing, and provides easy access to a spent filter element for replacement thereof.

Further features of the present invention will become apparent to those skilled in the art upon reviewing the following specification and attached drawings.

BRIEF DESCRIPTION OF THE DRAWINGS

FIG. 3 is an end view of the main housing portion for the filter cartridge of FIG. 1;

DETAILED DESCRIPTION OF THE PREFERRED EMBODIMENT

Figure 1:
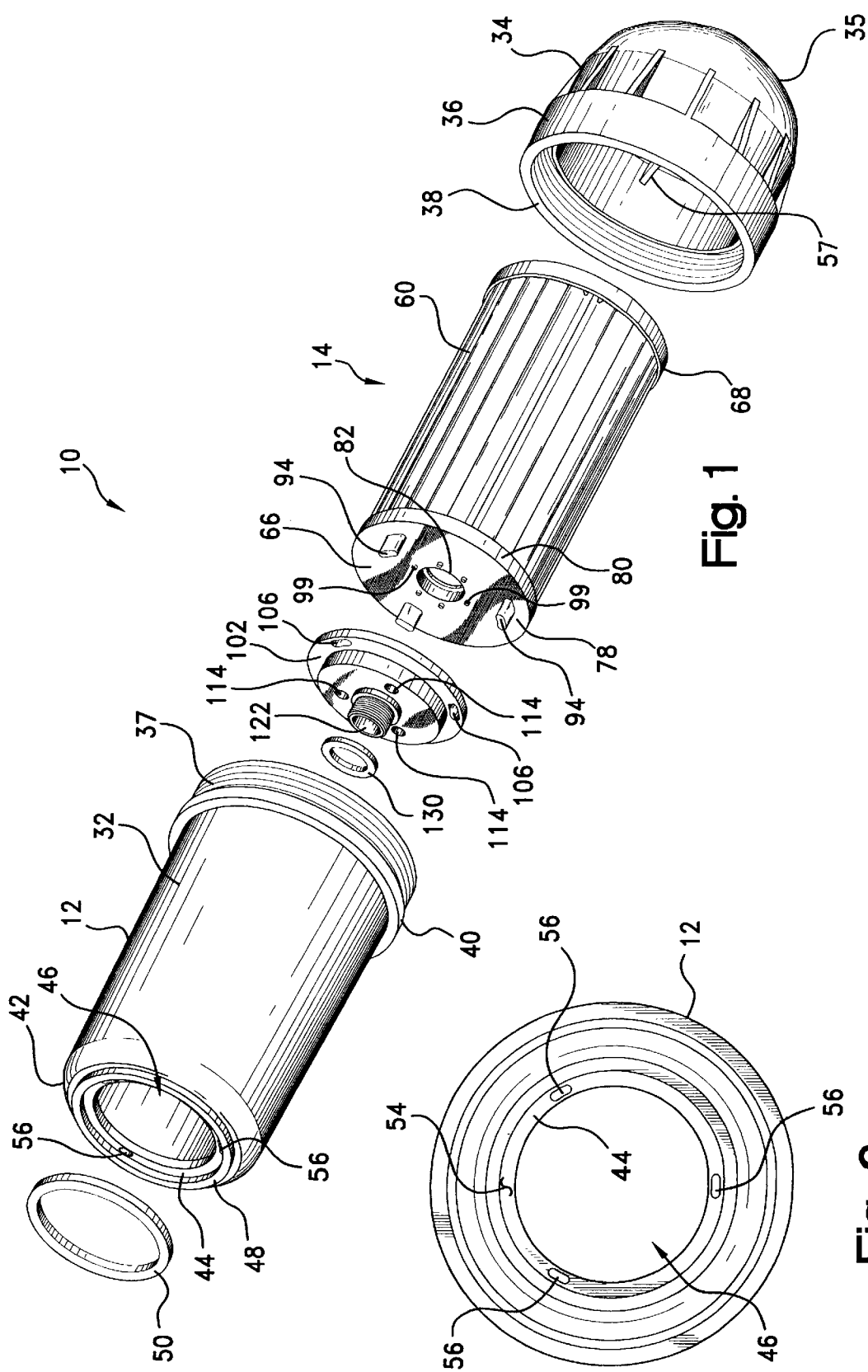
FIG. 1 is an exploded view, partly in phantom, of a filter cartridge constructed in accordance with the present invention.
Figure 2:
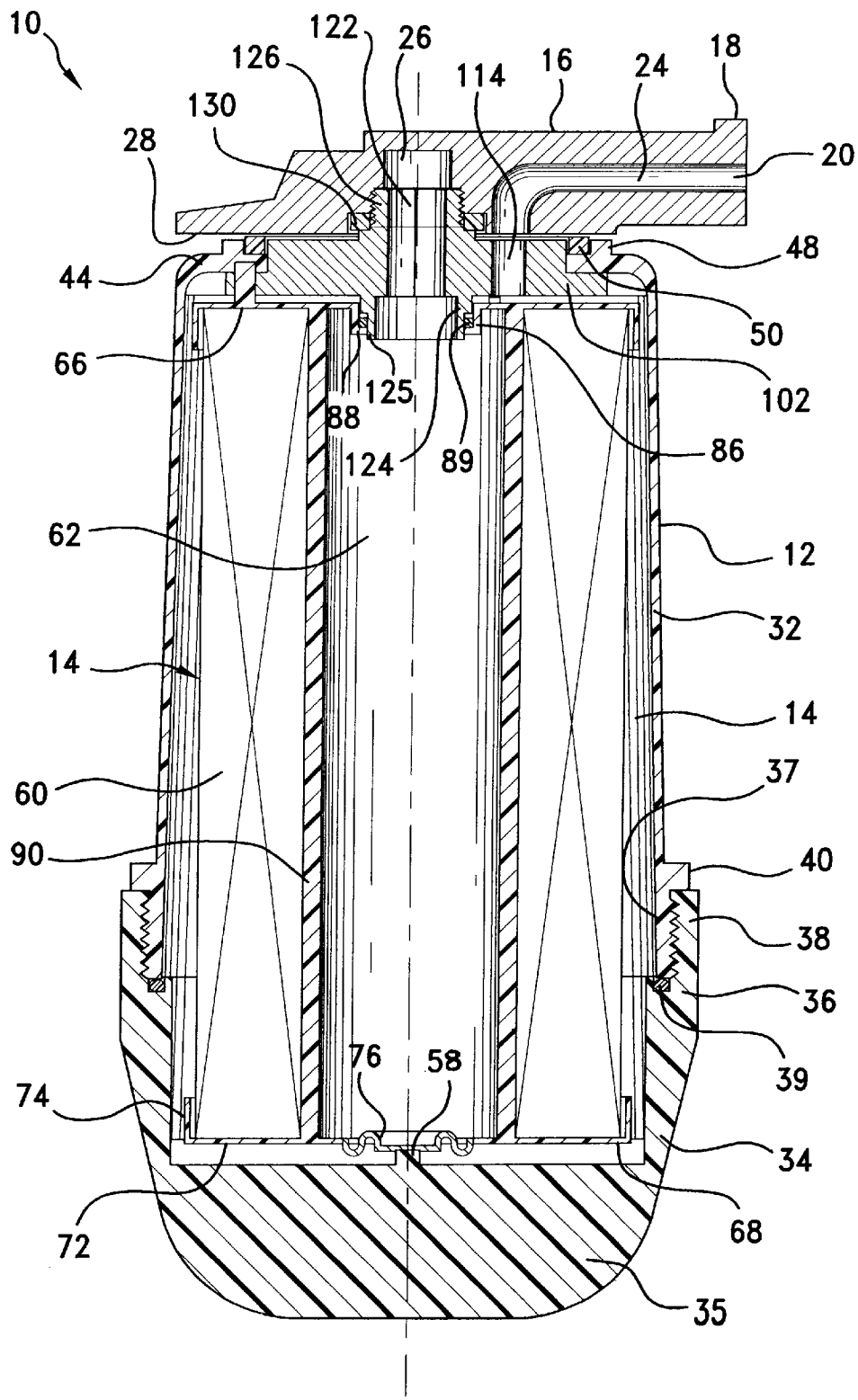
FIG. 2 is a sectional view of the filter cartridge of FIG. 1 shown assembled with a base.

Referring to the drawings, and initially to FIGS. 1 and 2, a filter cartridge, indicated generally at 10, is shown constructed according to the principles of the present invention. The invention is particularly intended for use in a fluid system such as in an internal combustion engine, although other uses are of course anticipated, as should be apparent to those skilled in the art. The filter cartridge 10 includes a filter housing 12 enclosing a replaceable element, indicated generally at 14. Housing 12 is designed to be removably mounted to a base or head 16. Base 16 is fastened to an engine or other suitable structure by a flange 18 to support filter assembly 10. Preferably, filter base 16 is aluminum die-cast and includes an inlet port 20, an outlet port (not shown), and connected respectively thereto inlet passage 24 and outlet passage 26. Base 16 is a generally circular structure having a flat annular mounting surface 28 at the lower portion thereof for sealing engagement to the filter housing 12.

The filter housing 12 includes a cylindrical main housing portion 32 and a bowl-shaped removable end closure 34. End closure 34 includes a generally flat end wall 35 and a cylindrical side wall 36 bounding end wall 35 and extending axially away therefrom. The main housing portion 32 includes an open end 37 having outwardly-projecting threads which mate with inwardly-projecting threads on the open end 38 of the cylindrical side wall 36. The main housing portion can be tightened down within the end closure 34 until an annular stop flange 40 (FIG. 2) engages the open end 38 of the end closure 34. The main housing portion 32 and end closure 34 when attached define an inner cavity 41 for filter element 14.

Main housing portion 32 further includes an open end 42 including an annular, radially in-turned lip 44 defining a central circular opening, indicated generally at 46, into cavity 41. An annular ridge 48 projects axially outward from the open end 42 and defines an outer wall for supporting a resilient annular head seal 50 for sealing against surface 28 of mounting base 16. The axial length of ridge 48 is preferably slightly less than the axial thickness of seal 50.

As shown in FIG. 3, the in-turned annular lip 44 of open end 42 includes an inwardly-facing annular lip surface 54 having a series of receiving slots 56 formed therein. Receiving slots 56 preferably only extend a portion of the axial distance through the lip 44 and are spaced evenly around the surface 54. The number, spacing and dimensions of receiving slots 56 can vary as will be discussed herein in more detail.

The end closure 34 of the housing includes a series of axially-extending flanges or ribs 57 which project upwardly from the end wall 35 of the closure member in a cross or "x" configuration and have a generally flat upper surface. A short, axially-extending button 58 is formed at the intersection of ribs 57 to support the end of the filter element 14.

The main housing portion 32 and end closure 34 are preferably each formed in one piece from relatively rigid, high-strength and light-weight material, for example hard plastic, glass-filled nylon or aluminum. One of the benefits of the present invention is that the main housing portion 32 and end closure 34 can be formed from more expensive material than typically used for disposable filter elements, as these components are re-used multiple times, and are not thrown away when the filter element is replaced. Using more durable materials generally increases the useful life of the filter housing. The techniques for forming the main housing portion 32 and end closure 34 should be known to those skilled in the art.

The filter element 14 for the filter cartridge preferably includes tubular filter media 60 which circumscribes a central axis and defines a central filter cavity 62 (FIG. 2). Filter media 60 preferably comprises a sheet of appropriate media material (e.g., paper) which is longitudinally pleated and secured together along its opposed circumferential ends, however, the structure (and material) of the filter media can vary depending on the particular application. The efficiency (micron rating) can also vary depending upon the particular application.

An end cap is secured to each end of the filter media. Specifically, a first end cap 66 is secured to one end of the media 60, while another end cap 68 is secured to a second end of the media. Each end cap preferably comprises a cup-shaped imperforate member which is secured to the end of the filter material with an appropriate adhesive or potting compound. Second end cap 68 preferably includes a flat, disk-shaped body portion 72 which is bounded at its periphery by an axially-extending annular flange 74. Annular flange 74 extends a short distance upwardly along the sides of the filter media 60 from the second end, in closely-fitting relation thereto. A convoluted circular spring 76 can be formed integrally with the central portion of the second end cap 68. Spring 76 is located on button 58 extending upwardly from ribs 57 to centrally locate and support filter element 14 in housing 12.

First end cap 66 similarly includes a flat, annular body portion 78 and an axially-extending annular flange 80 bounding the periphery of body 78, and extending a short distance downwardly along the side of media 60 from the first end. The body portion 78 of the first end cap 66 includes a central opening 82 into the central cavity 62 of the filter element. An annular sleeve 86 bounds opening 82 and extends axially inward a short distance into the central cavity 62. Sleeve 86 includes a radially-extending annular flange 88 (FIG. 2) at its inner distal end, which projects inwardly a short distance toward the central axis of the filter element—at right-angles to sleeve 86. Radial flange 88 supports a resilient O-ring 89 (FIG. 2), the reason for which will be described herein in more detail.

A central perforated core 90 extends between the first end cap 66 and second end cap 68 and supports the media material 60 along its inside diameter. Filter media 60 could also be self-supporting, i.e., "coreless", in which case core 90 would be absent. Central core 90, first end cap 66 and second end cap 68 are preferably formed of an appropriate light-weight and inexpensive material, e.g., plastic, and connected together as an integral unit using conventional manufacturing and assembly techniques (e.g., molding).

A series of drive pins 94 extend axially away from the outer surface of the annular body portion 78. Drive pins 94 are generally axially longer than they are wide and are integral with the end cap. The drive pins 94 can be secured as a separate piece to the annular body portion 78 such as with appropriate adhesive or by riveting, and more preferably the drive pins 94 are formed in one piece with the annular body portion 78 such as during a molding or forming operation. The drive pins 94 could also be closely received within corresponding axial slots formed in the body portion 78, which would provide some flexibility in locating the pins for a particular application. In any case, the drive pins 94 are preferably spaced between the opening 82 and the outer periphery of body 78 and are located in a generally circular array. While three drive pins are illustrated (and preferred), the number, spacing and dimensions (height and width) of the drive pins can vary depending upon the particular application, as will be also described herein in more detail.

A stand-off device comprising a series of discrete posts 99 are also disposed on the upper surface of the body portion 78 and extends axially upwardly therefrom. Preferably, posts 99 have an axial length which is less than the axial length of the drive pins 94. The posts 99 are generally axially wider than they are long, and are integral with the end cap such as being secured as a separate piece to the annular body portion 78 with an appropriate adhesive or by riveting, or more preferably are formed in one piece with annular body portion 78 such as during a molding or forming operation. Posts 99 are preferably located between central opening 82 and the outer periphery of body 78, more preferably are located between the central opening 82 and the drive pins, and most preferably are bounding the central opening 82 in a generally circular array. While six posts are illustrated, the number, spacing and dimensions (height and width) of the posts can also vary, as will be described herein in more detail.

Figures 4, 5:
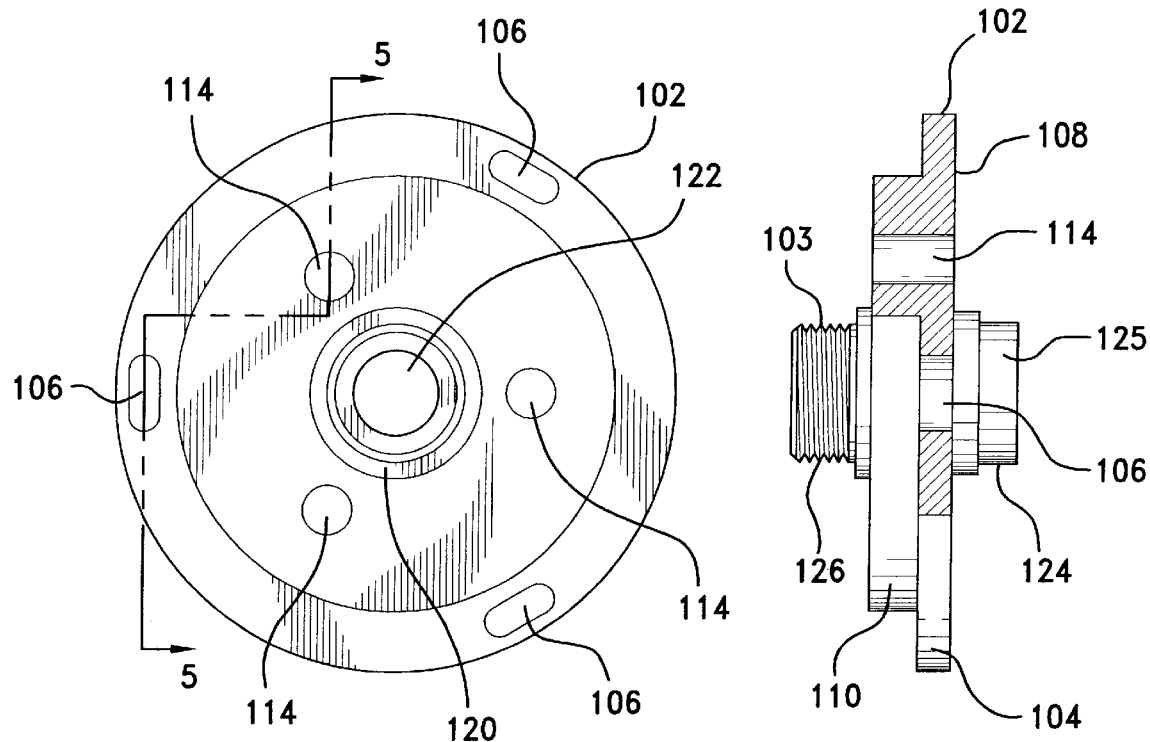
FIG. 4 is an end view of the mounting hub for the filter cartridge of FIG. 1.
FIG. 5 is a cross-sectional side view of the mounting hub taken essentially a long the plane defined by the lines 5—5 of FIG. 4.

A disk-shaped hub member 102 is disposed between the first end cap 66 of the filter element 14 and the inner annular lip 44 of the main housing portion 32. As shown in FIGS. 4 and 5, the mounting hub 102 includes a central cylindrical collar 103 and a first annular plate 104 surrounding collar 103 and having an outer dimension (as shown in FIGS. 1 and 2) which is equal to or slightly less than the outer peripheral dimension of first end cap 66, but which is greater than the inner diameter of the central opening 44 in the main housing portion 32. Plate 104 includes a series of axially-extending through-holes 106 spaced around plate 104 at locations designed to correspond to drive pins 94 on first end cap 78. The number of through-holes 106 preferably corresponds to the number of drive pins 94. Through-holes 106 receive drive pins 94 with a close fit, allowing the inner flat surface 108 of mounting hub 102 to be located opposite the outer flat surface of end cap 66 and generally rotationally fix the mounting hub 102 with respect to end cap 66 (and hence with respect to filter element 14).

Mounting hub 102 further includes a second annular plate 110 coaxial with first plate 104. Plate 110 has an outer radial dimension which is smaller than the outer radial dimension of plate 104, which allows the plate to fit closely within opening 44 in main housing portion 32 (see, e.g., FIG. 2). Through-holes 106 are located in the portion of first plate 104 which extends radially-outward of second plate 110. Plate 110 generally forms a groove with outer wall 48 to support the inner edge of head seal 50. A separate series of axially-extending through-holes 114 are formed through both of plates 110 and 104, at a location between collar 103 and the peripheral edge of plate 110. While three through-holes are illustrated, the number, spacing and dimensions of through-holes 114 can vary depending upon the particular application, as will be described herein in more detail. Mounting hub 102 is preferably formed in one piece from an appropriate long-lasting material, for example steel or aluminum.

The collar 103 of mounting hub 102 extends along the geometric axis of the mounting hub, and has a central through-bore 122. Bore 122 is generally aligned with opening 82 in first end cap 66 and the outlet passage 26 in base 16 to direct fluid flow therebetween. The inwardly-extending spud 124 of collar 103 extends in close relation to the downwardly-extending annular sleeve 86 of first end cap 66, and includes a reduced-diameter portion 125 at its distal end which is received within the opening formed by radial flange 88, and together with flange 88 defines a groove for receiving O-ring 89. O-ring seal 89 fluidly seals end cap 66 to mounting hub 102.

An outwardly-extending portion 126 of collar 103 has radially outward-projecting threads and is received within a threaded counterbore formed along passage 26 of base 16. An additional resilient O-ring seal 130 is located around the outer portion 126 of collar 103 and is received in an additional, shallow counterbore formed co-axial with passage 26 at the inner end of this passage. Seal 130 provides a fluid-tight seal between collar 103 and base 16. The threaded attachment could alternatively be reversed, that is, collar 103 could be inwardly-threaded, which would cooperate with outwardly-directed threads on a central spud projecting from base 16.

Figure 6:
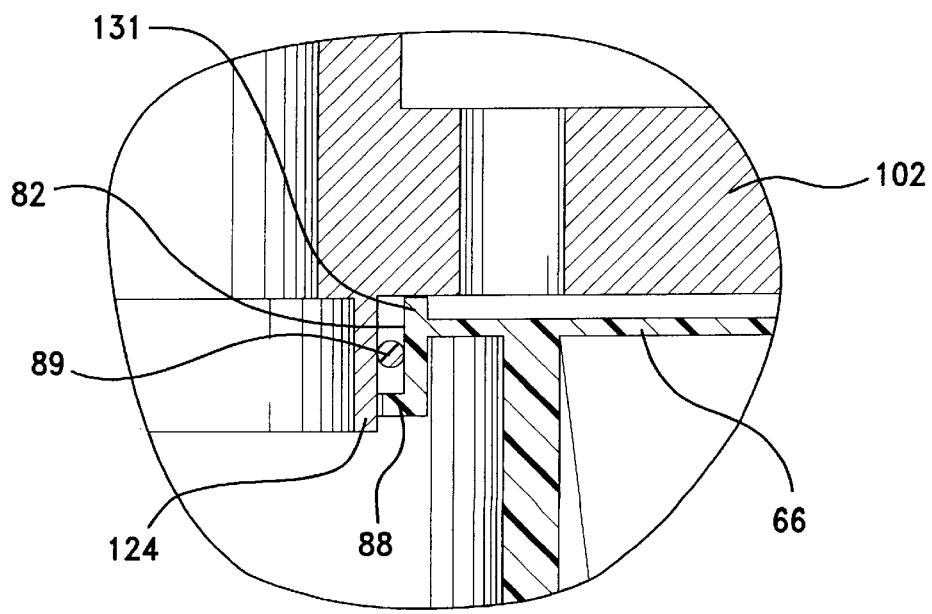
FIG. 6 is an enlarged cross-sectional side view of a portion of a further form of the mounting hub for the filter cartridge of FIG. 1.

A further form of the mounting hub 102 and first end cap 66 is shown in FIG. 6, where the inwardly-extending spud 124 on the mounting hub has a constant-diameter outer surface which defines a groove with flange 88 for O-ring 89. First end cap 66 includes a stand-off device in the shape of an annular collar or flange 131 extending axially away from the upper surface of first end cap 66 and bounding central opening 82. Again, the dimensions (height and width) of the collar of flange 131 can vary depending upon the particular application.

During assembly, seal 130 is located over collar 103 on mounting hub 102, and mounting hub 102 and filter element 14 are located between main housing portion 32 and end closure 34 of filter housing 12. Spring 76 on the lower end cap 68 of filter element is supported and pushed upwardly by button 58 on ribs 57. Main housing portion 32 and end closure 34 are tightened together, which causes filter element 14 to rotate until drive pins 94 on first end cap 66 become aligned with orientation through-holes 106 in mounting hub 102. When aligned, drive pins 94 project through holes 106, and upon further rotation become aligned with and insert into receiving slots 56 formed in the in-turned lip 44 of main housing portion 32. Mounting hub 102 can, of course, be initially correctly oriented with respect to end cap 66 with drive pins 94 received in orientation holes 106, and then the subassembly inserted into main housing portion 32 and rotated until pins 94 become aligned with receiving slots 56 in housing portion 32. In any case, drive pins 94 prevent mounting hub 102 from rotating with respect to filter housing 12. Rotation of filter housing 12 will thereby cause rotation of mounting hub 102, and allow the cartridge to be easily spun-on to base 16.

By locating drive pins 94 at selected locations around end cap 66, a particular filter element can be designed for a particular mounting hub and housing. Filter elements without such drive pins in the selected locations will not properly fit within the filter housing, as the pins will contact the lower surface of mounting hub 102 and prevent the housing portions from being fully tightened together. The mounting hub 102 will rotate with respect to housing 12, and hence will not be threaded onto base 16. The mounting hub 102 will similarly rotate freely if orientation pins 94 are missing on filter element 14, or if the filter element 14 is entirely missing from the housing. Only upon proper insertion of drive pins 94 at the proper locations around first end cap 66 into through-holes 106 in mounting hub 102 and into receiving slots 56 in filter housing 12 will rotation of filter housing 12 cause similar rotation of mounting hub 102 to tighten the filter assembly 10 onto base 16.

When a spent element is to be replaced, the housing 12 can be spun-off base 16 and the end closure 34 is removed (untightened) from main housing portion 32. The spent filter element is then removed and replaced with a fresh element having the same pin and stand-off structure. To prevent mounting hub 102 from falling out of main housing portion 32 when the filter element is removed, a snap ring (not shown) can be located in a groove around the inner surface of the main wall portion to engage and retain mounting hub 102.

When drive pins 94 are received within orientation slots 106, the stand-off device as shown in FIG. 1 (posts 99) or FIG. 6 (collar or flange 131) contacts the lower surface of hub member 102 and provides a clearance gap between the inner flat surface of mounting hub 102 and the outer flat surface of first end cap 66. The clearance gap allows fluid to flow from inlet passage 24 through a clearance provided between mounting hub 102 and base 16, through through-holes 114 in mounting hub 102, and radially-outward between the mounting hub 102 and first end cap 66 to the peripheral region of the filter element 14. Again, an end cap without such a stand-off device will allow the upper flat surface of the end cap to contact the lower flat surface of the mounting hub and effectively prevent flow from inlet passage 24 to reach the peripheral region of the filter element. Although less preferred, the stand-off device could also be disposed on the lower surface of the hub member 102 and extend axially downward therefrom to provide the clearance gap between the mounting hub 102 and the first end cap 66.

The stand-off device (particularly posts 99 in FIG. 1) generally directs the fluid flow evenly across the end cap to maximize the efficiency of the filter element. Seal 89 prevents fluid from passing radially-inward to the central cavity 62 of the filter element, while seal 130 prevents fluid leakage around collar 122. Mounting head seal 50 prevents fluid from escaping around the interface between base 16 and filter element housing 12. The fluid can then flow radially inward through the filter media 60, and axially outward through bore 122 in mounting hub 102 to outlet passage 26. While the filter cartridge has been described as filtering fluid flowing radially-inward through the element, it should be apparent that the cartridge could just as easily filter fluid flowing radially-outward through the element.

The number, spacing and dimension of through-holes 114 can vary depending upon the particular application requirements, with a greater amount or a larger dimension of through-holes generally increasing the fluid flow to the filter element. The number, spacing and dimension of the stand-off device (posts 99 or collar or flange 131) can also vary depending upon the flow requirements between mounting hub 102 and end cap 66. Generally the stand-off device should be configured so as to minimize the pressure drop caused by its presence between the mounting hub and filter element, and to provide even distribution of fluid across the end cap.

As described above, a novel and unique spin-on type of filter cartridge and replaceable element is provided by the present invention. The filter cartridge prevents improper, inappropriate or missing elements from being used in the housing, and minimizes the disposal waste when the element is replaced. The cartridge also is easy to attach to and remove from a base, and allows the use of stronger and longer-lasting material for the housing. Finally, the housing portions of the cartridge can be easily separated, which allows easy access to a spent filter element for replacement thereof.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element removeably positionable within a housing formed by mating housing portions, the filter element comprising:

tubular filter media circumscribing a central axis and defining a central cavity, said filter media having a first end and a second end;

a first end cap affixed to the first end of the filter media and a second end cap affixed to the second end of the filter media, said first end cap including an annular portion secured directly to the first end of the filter media and defining a central opening into the central cavity of the filter media, at least one drive pin disposed on an outer surface of the annular portion and extending axially away from the first end cap, and a stand-off device also disposed on the outer surface of the annular portion and extending axially away from the first end cap, said stand-off device fixedly secured directly to the annular portion of said first end cap, and said drive pin having a greater axial length than the stand-off device wherein said stand-off device is located along the annular portion of the first end cap radially inward from the at least one drive pin and is spaced radially outwardly apart from said central opening.

2. The filter element as in claim 1, further including a plurality of drive pins secured to the outer surface of the annular portion of the first end cap and extending axially away from the first end cap, said plurality of drive pins disposed in a substantially circular array coaxial with the central axis of the filter media.

3. The filter element as in claim 2, further including a plurality of stand-off device elements secured to the outer surface of the annular portion of said first end cap and extending axially away from the first end cap, said plurality of stand-off device elements defining a plurality of flow paths along the outer surface of the annular portion.

4. The filter element as in claim 3, wherein said plurality of stand-off device elements are disposed in a substantially circular array coaxial with the central axis of the filter media, said circular array of stand-off device elements located radially inward of said circular array of drive pins.

5. The filter element as in claim 4, wherein said plurality of stand-off device elements bound the central opening of the annular portion of the first end cap.

6. The filter element as in claim 1, wherein said at least one drive pin is axially longer than it is wide.

7. The filter element as in claim 1, wherein said stand-off device is located on a flat surface portion of said first end cap.

8. The filter element as in claim 1, wherein said annular portion of said first end cap has an inner surface, opposite from the outer surface, adhesively attached to the first end of the filter media.

9. The filter element as in claim 1, wherein said at least one drive pin and said stand-off device are molded together in one piece with the annular portion of the first end cap.

10. The filter element as in claim 1, wherein said at least one drive pin is secured at an inner end directly to the annular portion of the first end cap and extends to a distal outer end spaced apart from the first end cap, the at least one drive pin being continuously straight along the entire length of the drive pin.

11. A replaceable filter element removeably positionable within a housing formed by mating housing portions, the filter element comprising:

tubular filter media circumscribing a central axis and defining a central cavity, said tubular filter media having a first end and a second end;

a first disc-shaped end cap having an annular portion with an inner surface adhesively secured directly to the first end of the filter media, and a second disc-shaped end cap having an inner surface adhesively secured to the second end of the filter media, said annular portion defining a central opening into the central cavity of the filter media, and a circular array of drive pins integral with the annular portion and extending axially away from an outer surface of the annular portion of the first end cap, said drive pins being spaced-apart from one another around the first end cap between the central opening in the annular portion and a peripheral edge of the first end cap, and a stand-off device also integral with the annular portion and extending axially away from the outer surface of the annular portion of the first end cap, said stand-off device disposed radially-inward of the circular array of drive pins around the first end cap, fixedly secured directly to the annular portion of said first end cap, and said stand-off device having a shorter axial length than the drive pins.

12. The filter element as in claim 11, wherein said stand-off device bounds the central opening in the first end cap.

13. The filter element as in claim 11, wherein said stand-off device comprises a plurality of axially-extending elements spaced around the first end cap.

14. The filter element as in claim 11, wherein said drive pins are secured at one end directly to the annular portion of the first end cap and extend to distal outer ends spaced apart from the first end cap, each of the drive pins being continuously straight along the entire length of the pin.

15. A filter subassembly removeably positionable within a housing formed by mating housing portions, the filter subassembly comprising:

a tubular filter element circumscribing a central axis and defining a central cavity, said filter element having a first end and a second end, a first end cap disposed on the first end of the filter element and a second end cap disposed on the second end of the filter element; said first end cap including an annular portion defining a central opening into the central cavity of the filter element, at least one drive pin integral with an outer surface of the annular portion and extending axially away from the first end cap, a disc-shaped mounting hub having a threaded central collar with a central through-hole axially aligned with the central opening in the first end cap and a radially outer peripheral edge, at least one other through-hole disposed radially outward from the central through-hole, and at least one orientation through-slot receiving the at least one drive pin of the first end cap to prevent the filter element from rotating with respect to the mounting hub, and an O-seal bounding the central opening in the first end cap radially inward from the at least one other through-hole in the mounting hub and disposed between the first end cap and the mounting hub for providing a fluid seal therebetween, and wherein an axially-extending stand-off device is disposed between the outer surface of the annular portion of the first end cap and an inner surface of the mounting hub, said stand-off device providing a stand-off gap between the inner surface of the mounting hub and the outer surface of the annular portion of the first end cap and extending to the radially outer peripheral edge of the mounting hub, to provide a flow path from the at least one other through-hole in the mounting hub radially outward to the radially outer peripheral edge of the mounting hub and between the inner surface of the mounting hub and the outer surface of the annular portion of the first end cap, said stand-off device being fixedly secured directly to the annular portion of said first end cap.

16. The filter subassembly as in claim 15, wherein the mounting hub has a flat inner surface, and the annular portion has an opposed flat outer surface, with the flat surfaces of the mounting hub and the annular portion being spaced-apart by the stand-off device.

17. The filter subassembly as in claim 16, further including a plurality of stand-off device elements secured to the outer surface of the annular portion of said first end cap and extending axially away from the first end cap to the inner surface of the mounting hub, said plurality of stand-off device elements defining a plurality of flow paths along the outer surface of the annular portion between the mounting hub and the first end cap.

18. The filter subassembly as in claim 17, wherein said at least one drive pin has a greater axial length than the stand-off device elements.

19. The filter subassembly as in claim 18, wherein said at least one drive pin and said plurality of stand-off device elements are molded in one piece together with the annular portion of the first end cap.

20. The filter subassembly as in claim 15, wherein said annular portion of said first end cap has an inner surface, opposite from the outer surface, adhesively attached directly to the first end of the filter element.

21. The filter element as in claim 15, wherein said at least one drive pin is secured at one end directly to the annular portion of the first end cap and is continuously straight along the entire length of the pin.

22. The filter element as in claim 15, wherein the mounting hub includes an inner surface facing the filter element, and an opposite outer surface facing away from the filter element, and the threaded central collar of the mounting hub extends axially away from the outer surface of the mounting hub and has radially outward-projecting threads, and wherein the central through-hole of the mounting hub extends internally of the collar.

23. The filter subassembly as in claim 15, wherein said annular portion of said first end cap has an inner surface, opposite from the outer surface, adhesively attached directly to the first end of the filter element.

24. A filter cartridge, comprising:
  a filter housing having a cylindrical main housing portion with opposite ends defining central circular openings into the main housing portion and a removable closure portion enclosing one end of said main housing portion, means for removably attaching said closure portion to said one end of said main housing said main housing portion and said closure portion defining a filter element cavity, the other end of said main housing portion including an open annular end having an in-turned annular lip defining a central circular opening into the filter element cavity, said in-turn annular lip having an inner annular lip surface into the filter element cavity, with at least one receiving slot formed in the inner lip surface,
  a filter element disposed within the filter element cavity, said filter element including tubular filter media circumscribing a central axis and defining a central cavity, said filter element having first and second ends, with first and second end caps sealingly attached to the first and second ends of the filter media, one of said end caps including an annular portion defining a central opening into the central cavity of the filter element, and at least one drive pin extending axially away from the annular portion from an outer surface thereof,
  a disc-shaped mounting hub disposed between said first end cap of said filter element and said inner surface of said in-turned annular lip of said main housing portion, said mounting hub including an axially-extending threaded collar along the geometric axis of the mounting hub with a first through-hold defining a first fluid pathway through the mounting hub into the central cavity of the filter element, and at least one other through-hole spaced radially apart from the first through-hold, said at least one other through-hole defining a second fluid pathway through the mounting hub, said mounting hub further including an orientation bore extending axially through said mounting hub, wherein said at least one drive pin on said filter element is removeably and freely received through said orientation bore in said mounting hub, and in said receiving slot in said inner surface in said in-turned annular lip of said main housing portion to prevent said mounting hub from rotating with respect to said filter housing, and a stand-off device interposed between said mounting hub and said first end cap and defining a flow path from the second fluid pathway to an outer peripheral region of the filter element, said stand-off device being fixedly secured directly to said annular portion of first end cap.

25. The filter cartridge as in claim 24, wherein a first O-seal bounds said central opening in said first end cap and is disposed between said first end cap of said filter element and said mounting hub to provide a fluid seal therebetween.

26. The filter cartridge as in claim 25, wherein said first O-seal surrounds said collar of said mounting hub and is disposed between said collar and said first end cap.

27. The filter cartridge as in claim 26, wherein said first end cap includes an inwardly and axially-extending annular sleeve bounding the central opening, and said mounting hub includes an inwardly and axially-extending cylindrical collar bounding the first fluid pathway, said cylindrical collar extending co-axially with and surrounded by said annular sleeve, and said first O-seal is disposed between the annular sleeve and the cylindrical collar.

28. The filter cartridge as in claim 27, wherein said annular sleeve on said first end cap includes a radially in-turned flange and said cylindrical collar including a reduced diameter portion, said radially in-turned flange of said annular sleeve and said reduced-diameter portion defining an annular groove for said first O-seal.

29. The filter element as in claim 25, wherein said at least one drive pin is secured at one end directly to the annular portion of the first end cap and is continuously straight along the entire length of the pin.

30. The filter element as in claim 25, wherein the mounting hub includes an inner surface facing the filter element, and an opposite outer surface facing away from the filter element, and the threaded central collar of the mounting hub extends axially away from the outer surface of the mounting hub and has radially outward-projecting threads, and wherein the central through-hole of the mounting hub extends internally of the collar.

31. The filter cartridge as in claim 24, further including a plurality of stand-off device elements interposed between said mounting hub and said first end cap defining plural flow areas to the outer peripheral region.

32. The filter cartridge as in claim 31, wherein said plurality of stand-off device elements are disposed in a circular array co-axial with the central axis of the filter media.

33. The filter cartridge as in claim 32, wherein said stand-off device elements bound the central opening in the first end cap, and said at least one drive pin is disposed radially between said stand-off device elements and an outer peripheral edge of the first end cap.

34. The filter cartridge as in claim 33, wherein said stand-off device elements comprise axially-extending posts.

35. The filter cartridge as in claim 24, wherein said at least one stand-off device is molded together with the annular portion in one piece.

36. The filter cartridge as in claim 24, wherein said mounting hub and said first end cap of said filter element include opposed flat surfaces, and a stand-off device is interposed between the opposed surfaces to allow fluid flow therebetween.

37. The filter cartridge as in claim 36, wherein said stand-off device has a shorter axial length than the at least one drive pin.

38. The filter cartridge as in claim 37, wherein said at least one drive pin and said stand-off device are located on a flat surface portion of said first end cap.

39. The filter cartridge as in claim 38, wherein said at least one drive pin and said stand-off device are molded together with the annular portion in one piece.

40. The filter cartridge as in claim 24, wherein said at least one drive pin is secured to the annular portion of said one end cap.

41. The filter cartridge as in claim 40, wherein said at least one drive pin is molded in one piece with said one end cap.

42. The filter cartridge as in claim 24, wherein said disc-shaped mounting hub has an outer periphery with a diameter which is greater than the inner diameter of the annular lip defining the central circular opening, and less than the inner diameter of the main housing portion bounding the annular lip at the open annular end of the housing.

43. The filter cartridge as in claim 24, wherein said end closure is threadably retained on said cylindrical main housing portion and provides an imperforate end cap for the filter housing.

44. The filter cartridge as in claim 24, wherein said inner surface of said in-turned annular lip includes a plurality of receiving slots spaced around the inner lip surface at predetermined locations, said mounting hub includes a corresponding number of orientation bores spaced at the predetermined locations, and said one of said end caps includes a plurality of drive pins also at the predetermined locations such that each of said orientation pins in the filter element end cap pass through a respective orientation bore in the mounting hub and into a respective receiving slot in the in-turned annular lip of said first end cap.

45. The filter cartridge as in claim 24, wherein said main housing portion has an outer surface with an annular groove, and an annular head seal is disposed in the annular groove in the main housing portion.

46. The filter cartridge as in claim 45, wherein said collar of said mounting hub extends inwardly through said central circular opening in said filter housing main housing portion as well as outwardly away from said mounting hub, and further including an annular seal disposed around the outwardly-extending portion of said mounting collar.

47. The filter cartridge as in claim 24, wherein said main housing portion and end closure cooperate to engage and support the first and second end caps of the filter element.

48. A filter cartridge for attachment to a base, said base having an inlet passage and an outlet passage, the filter cartridge comprising:

a filter housing having a main housing portion with opposite ends defining central circular openings into the main housing portion, and a removable closure portion enclosing one end of said main housing portion, means for removably attaching said closure portion to said one end of said main housing said main housing portion and said closure portion defining a filter element cavity, said filter housing including an open annular end having an in-turned annular lip defining a central circular opening into the filter element cavity, said in-turned annular lip having an inner annular lip surface facing into the filter element cavity, with at least one receiving slot formed in the inner lip surface, a filter element disposed within the filter element cavity, said filter element including tubular filter media circumscribing a central axis and defining a central cavity, said filter element having first and second ends, with first and second disc-shaped end caps supported at the ends of the filter media, one of said end caps including an annular portion defining a central opening into the central cavity of the filter element, and at least one drive pin extending axially away from the annular portion from an outer surface thereof, a disc-shaped mounting hub disposed between said first end cap of said filter element and said inner surface of said in-turned annular lip of said main housing portion, said mounting hub including a central threaded collar for threaded attachment with the base with a through-hole defining a first fluid pathway through the mounting hub from one of the passages in the base, and at least one other through-hole spaced radially apart from the first through-hole, said at least one other through-hole defining a second fluid pathway through the mounting hub from the other of the passages in the base, said mounting hub further including an orientation bore extending axially through said mounting hub, wherein said drive pin on said filter element is received through said orientation bore in said mounting hub, and in said receiving slot in said inner surface in said in-turned annular lip of said main housing portion to prevent said filter element from rotating with respect to said filter housing, and a stand-off device interposed between said mounting hub and said first end cap and defining a flow path from the second fluid pathway to an outer peripheral region of the filter element, said stand-off device being fixedly secured directly to the annular portion of said first end cap.

49. The filter cartridge as in claim 48, further including an O-seal bounding said central opening in said first end cap and disposed between said first end cap of said filter element and said mounting hub to provide a fluid seal therebetween, and an annular head seal disposed between the main housing portion and the base radially outward from said at least one other through-hole.

50. The filter subassembly as in claim 48, wherein said annular portion of said first end cap has an inner surface, opposite from the outer surface, adhesively attached to the first end of the filter element.

51. The filter element as in claim 48, wherein said at least one drive pin is secured at one end directly to the annular portion of the first end cap and is continuously straight along the entire length of the pin.

52. The filter element as in claim 48, wherein the mounting hub includes an inner surface facing the filter element, and an opposite outer surface facing away from the filter element, and the threaded central collar of the mounting hub extends axially away from the outer surface of the mounting hub and has radially outward-projecting threads, and wherein the central through-hole of the mounting hub extends internally of the collar.

* * * * *